J. B. Clark,

Drilling Metals.

No. 107,875. Patented Oct. 4, 1870.

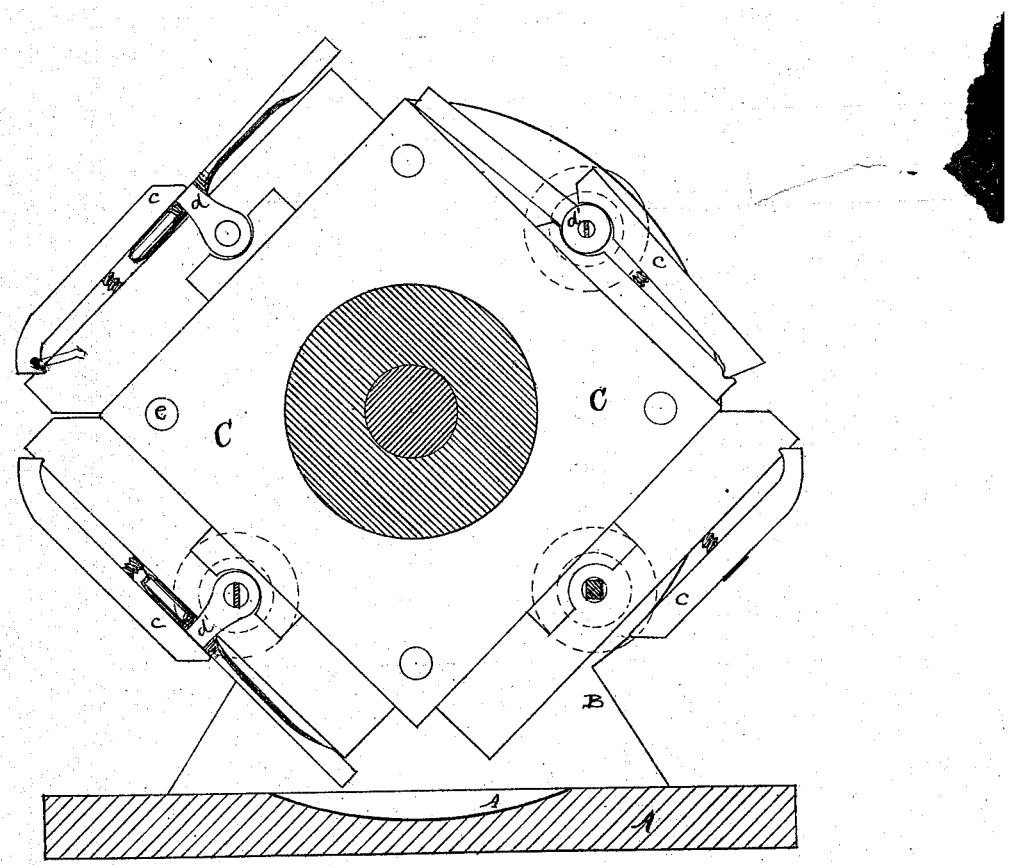

United States Patent Office.

JAMES B. CLARK, OF PLANTSVILLE, CONNECTICUT.

Letters Patent No. 107,875, dated October 4, 1870.

IMPROVEMENT IN MACHINES FOR DRILLING CARRIAGE-SHACKLES.

The Schedule referred to in these Letters Patent and making part of the same.

I, JAMES B. CLARK, of Plantsville, in the county of Hartford and State of Connecticut, have invented certain new and useful Improvements in Machine for Drilling Carriage-Shackles, of which the following is a specification.

My invention consists in the employment of a revolving frame, provided with clamps, and arranged between two series of revolving drills and taps, as hereafter described.

In the accompanying drawing—

Figure 2 is a sectional view of the same on line $xx$.

Figure 1:
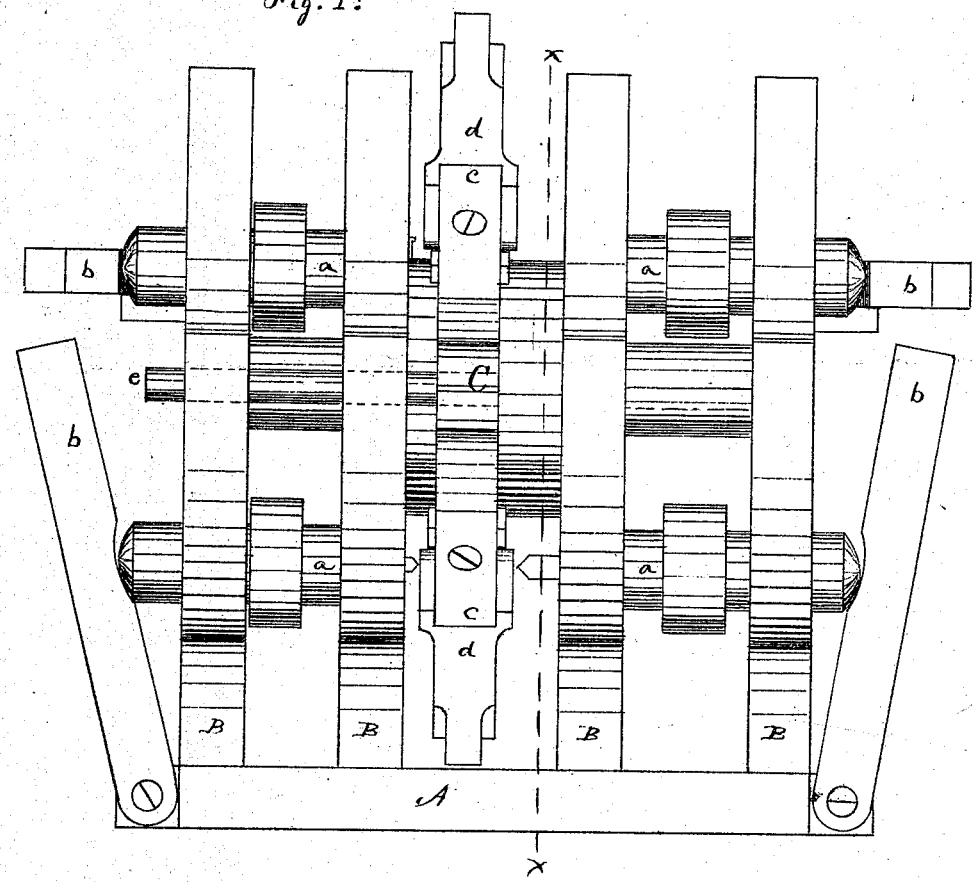
Figure 1 is a front elevation of my machine.

A designates the base of the machine, which is provided with uprights B B B B, in which are the bearings for the three pairs of spindles, $a\ a$.

In fig. 1 the rear pair of lower spindles are hid from view by the pair immediately in front of them, but the proper position of all is indicated by the broken circles in fig. 2.

Suitable levers $b$ are arranged to move the spindles endwise, but in use it is designed to have them fed automatically by a screw, weight, or other ordinary mechanism.

C designates a revolving frame, provided with suitable clamps $c\ c\ c\ c$, and revolving on an axis, which is at an equal distance from the axis of each pair of spindles $a\ a$.

The clamps may be arranged to receive the main part of the shackle $d$, to which the ears are attached, or to receive the shackle eye $d'$.

The frame C is arranged to be stopped at each each quarter revolution by the pin $e$ entering the frame C. While stopped in this manner, a shackle is placed with its "clip-end" pointing in a certain direction, in the forward upper clamp, which clamp is not in front of either of the spindles; a quarter revolution brings it in front of the first or lower front pair of spindles $a\ a$, the right-hand one of which carries a drill of a size proper to drill a hole suitable to receive the body of the shackle-bolt, while the left-hand spindle carries a drill of a size proper to make a hole suitable to be threaded for the threaded end of the same bolt.

The drills and spindles $a\ a$ move forward simultaneously, and drill each of the ears, while, at the same time, the operator places another shackle in the clamps $c$, taking care to place its clip-end in the opposite direction from that of the one previously inserted, as shown in the drawing, by which means the ears are properly drilled in pairs. Another turn of the frame C, the shackle last placed in the clamps is drilled as before described, while simultaneously one of the rear lower spindles, carrying a tap, advances and threads the ear having the small hole, while, at the third pair of spindles, a drill or reamer, simultaneously with all the former operations, trims out the large hole, making them of a uniform size.

When eyes $d'$ are to be drilled, the first pair of spindles $a\ a$ have drills of an equal size in each, but are arranged so that one retreats sooner than the other, while the remaining drill finishes the hole. The next turn or stop of the frame C, the hole is sized by a drill or a reamer, while, at the third pair of spindles, a sweep or mill sweeps off the ends of the eyes $d'$, making them of uniform length, and bringing their ends square with the hole.

I claim as my invention—

The revolving frame C, when provided with clamps $c\ c\ c\ c$, and arranged between two series of revolving drills and taps $a\ a\ a$, substantially as and for the purpose described.

JAMES B. CLARK.

Witnesses:
JAMES SHEPARD,
C. A. SHEPARD.